(12) United States Patent
Saito et al.

(10) Patent No.: US 9,437,365 B2
(45) Date of Patent: Sep. 6, 2016

(54) ELECTRONIC COMPONENT AND MANUFACTURING METHOD THEREFOR

(71) Applicant: MURATA MANUFACTURING CO., LTD., Nagaokakyo-shi, Kyoto-Fu (JP)

(72) Inventors: Akira Saito, Nagaokakyo (JP); Makoto Ogawa, Nagaokakyo (JP); Akihiro Motoki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 204 days.

(21) Appl. No.: 14/324,325

(22) Filed: Jul. 7, 2014

(65) Prior Publication Data

US 2014/0321025 A1    Oct. 30, 2014

Related U.S. Application Data

(63) Continuation of application No. PCT/JP2013/050388, filed on Jan. 11, 2013.

(30) Foreign Application Priority Data

Jan. 23, 2012 (JP) ................... 2012-010761

(51) Int. Cl.
| | |
|---|---|
| H01G 4/252 | (2006.01) |
| H01G 4/30 | (2006.01) |
| H01G 4/232 | (2006.01) |
| C25D 5/12 | (2006.01) |
| C25D 5/50 | (2006.01) |
| H01G 4/12 | (2006.01) |
| C25D 3/14 | (2006.01) |
| C25D 3/30 | (2006.01) |
| C25D 17/16 | (2006.01) |

(52) U.S. Cl.
CPC ............... *H01G 4/252* (2013.01); *C25D 5/12* (2013.01); *C25D 5/505* (2013.01); *H01G 4/232* (2013.01); *H01G 4/2325* (2013.01); *H01G 4/30* (2013.01); *C25D 3/14* (2013.01); *C25D 3/30* (2013.01); *C25D 17/16* (2013.01); *H01G 4/12* (2013.01)

(58) Field of Classification Search
CPC .... H01G 4/252; H01G 4/2325; H01G 4/232; H01G 4/30; H01G 4/12; C25D 5/505; C25D 5/12
See application file for complete search history.

(56) References Cited

U.S. PATENT DOCUMENTS

| | | | | |
|---|---|---|---|---|
| 6,773,827 | B2* | 8/2004 | Higuchi | H01G 4/232 148/518 |
| 2002/0001712 | A1 | 1/2002 | Higuchi | |
| 2009/0053553 | A1 | 2/2009 | Masago et al. | |
| 2010/0089982 | A1 | 4/2010 | Sakuyama | |
| 2012/0288724 | A1* | 11/2012 | Ogawa | C23C 26/00 428/457 |
| 2012/0288731 | A1* | 11/2012 | Motoki | C23C 28/021 428/648 |
| 2012/0314336 | A1* | 12/2012 | Ogawa | C25D 5/12 361/305 |

FOREIGN PATENT DOCUMENTS

| | | | |
|---|---|---|---|
| JP | 2001-335987 | A | 12/2001 |
| JP | 2005294618 | A * | 10/2005 |
| JP | 2006-249460 | A | 9/2006 |
| JP | 2009-052076 | A | 3/2009 |
| WO | WO-2006-134665 | A1 | 12/2006 |

OTHER PUBLICATIONS

PCT/JP2013/050388 Written Opinion dated Apr. 9, 2013.
PCT/JP2013/050388 ISR dated Apr. 9, 2013.

* cited by examiner

*Primary Examiner* — David M Sinclair
(74) *Attorney, Agent, or Firm* — Arent Fox LLP

(57) ABSTRACT

An electronic component including an electronic component element with an external electrode, a Ni plating film on the external electrode, and a Sn plating film covering the Ni plating film. The Sn plating film has Sn—Ni alloy flakes therein, the Sn—Ni alloy flakes are present in the range from a surface of the Sn plating film on the Ni plating film to 50% or less of the thickness of the Sn plating film, and when Sn is removed from the Sn plating film to leave only the Sn—Ni alloy flakes, an observed planar view of a region occupied by the Sn—Ni alloy flakes falls within the range from 15% to 60% of the observed planar region.

14 Claims, 4 Drawing Sheets

FLAKE-LIKE Sn-Ni ALLOY GRAINS

FLAKE-LIKE Sn-Ni ALLOY GRAINS

FLAKE-LIKE Sn-Ni ALLOY GRAINS

ELECTRONIC COMPONENT AND MANUFACTURING METHOD THEREFOR

CROSS REFERENCE TO RELATED APPLICATIONS

The present application is a continuation of International application No. PCT/JP2013/050388, filed Jan. 11, 2013, which claims priority to Japanese Patent Application No. 2012-010761, filed Jan. 23, 2012, the entire contents of each of which are incorporated herein by reference.

FIELD OF THE INVENTION

The present invention relates to an electronic component, and more particularly, to an electronic component such as, for example, a laminated ceramic capacitor including a Sn plating film, and a method for manufacturing the electronic component.

BACKGROUND OF THE INVENTION

As background techniques for the present invention, members with a film formed to contain Sn as its main constituent, methods for forming films, and soldering methods are disclosed in, for example, International Publication WO 2006/134665 (see Patent Document 1).

In recent years, from an environmental perspective, the film formation by metal plating containing Sn as its main constituent without containing any Pb on terminals for connectors, lead frames for semiconductor integrated circuits, etc. has been examined, in place of conventionally applied Sn—Pb solder plating. Such films containing no Pb are likely to generate Sn whisker-like crystals referred to as whiskers. The whiskers range from several μm to several tens of mm in length, and may cause failure of electrical short circuit between adjacent electrodes. In addition, when the whiskers are detached from the films to fly apart, the flying whiskers will cause short circuit inside and outside the system.

The technique disclosed in Patent Document 1 forms alloy grains of Sn and Ni at Sn crystal grain boundaries, in particular, in films containing Sn as their main constituent, for the purpose of providing members including films that can inhibit the generation of such whiskers. The formation of such Sn—Ni alloy grains can inhibit whisker growth.

Patent Document 1: International publication WO 2006/134665

SUMMARY OF THE INVENTION

However, it has been determined that the film disclosed in Patent Document 1 is unable to adequately inhibit whisker growth when the thermal shock test or the like is carried out which is specified by JEDEC standards regarded as an industry standard.

Therefore, in electronic components such as, for example, laminated ceramic capacitors including Sn plating films, it is desirable to dramatically enhance the whisker-inhibiting ability.

Therefore, a main object of the present invention is to provide an electronic component which has a whisker-inhibiting ability dramatically enhanced, and a manufacturing method therefor.

The present invention provides an electronic component including an electronic component element with an external electrode formed, a Ni plating film formed on the external electrode, and a Sn plating film formed to cover the Ni plating film, characterized in that the Sn plating film has Sn—Ni alloy flakes formed therein, the Sn—Ni alloy flakes are present in the range from a surface of the Sn plating film on the Ni plating film to 50% or less of the thickness of the Sn plating film, and when Sn is removed from the Sn plating film to leave only the Sn—Ni alloy flakes, and observed, in a planar view, the surface with the Sn—Ni alloy flakes appearing through the Sn removal, the region occupied by the Sn—Ni alloy flakes falls within the range from 15% to 60% of the observed planar region. This electronic component may further include an intermetallic compound layer of $Ni_3Sn_4$.

Furthermore, the present invention provides a method for manufacturing an electronic component, which is characterized in that it includes the steps of preparing an electronic component element having an external electrode formed, forming a Ni plating film on the external electrode, forming a first Sn plating film on the Ni plating film, forming Sn—Ni alloy flakes in the first Sn plating film, and forming a second Sn plating film on the first Sn plating film including the Sn—Ni alloy flakes so that the thickness of the first Sn plating film including the Sn—Ni alloy flakes falls within the range of 50% or less of the thickness of the entire Sn plating film composed of the first Sn plating film including the Sn—Ni alloy flakes and the second Sn plating film. This method for manufacturing an electronic component may include a step of forming an intermetallic compound layer of $Ni_3Sn_4$ between the Ni plating film and the first Sn plating film after the step of forming the second Sn plating film.

The present invention can achieve an electronic component that has a whisker-inhibiting ability enhanced, in particular, in terms of whisker grown length. In addition, the method in the description can manufacture an electronic component which has the whisker-inhibiting ability enhanced.

The above-mentioned object, other objects, features, and advantages of the present invention will be further evident from the following description with reference to the drawings.

DETAILED DESCRIPTION OF THE INVENTION

Figure 1:
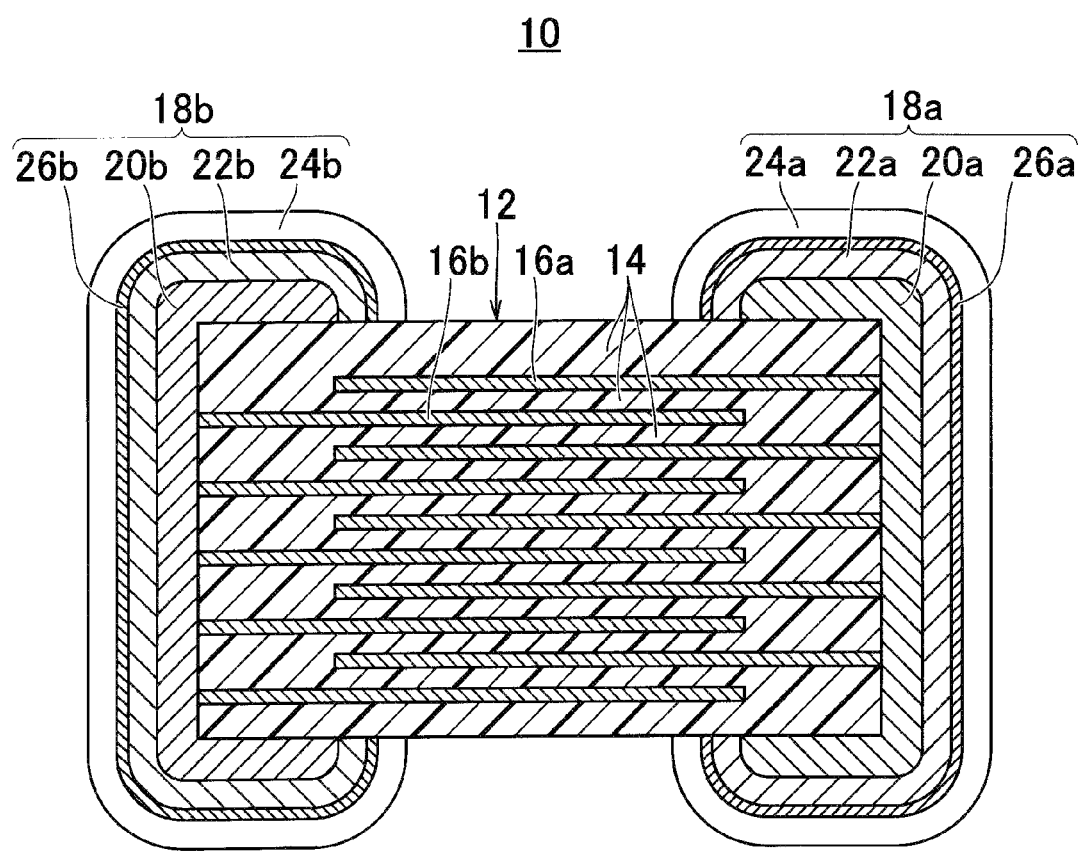
FIG. 1 is a schematic cross-sectional view illustrating a laminated ceramic capacitor as an example of an electronic component according to the present invention.

FIG. 1 is a schematic cross-sectional view illustrating a laminated ceramic capacitor as an example of an electronic component according to the present invention. The laminated ceramic capacitor 10 shown in FIG. 1 includes a cuboidal ceramic element 12 as an electronic component element. The ceramic element 12 includes, as a dielectric, a number of ceramic layers 14 composed of, for example, a barium titanate dielectric ceramic. These ceramic layers 14 are laminated, and internal electrodes 16a and 16b composed of, for example, Ni are alternately formed between the ceramic layers 14. In this case, the internal electrodes 16a are formed to have ends extending to one end of the ceramic element 12. In addition, the internal electrodes 16b are formed to have ends extending to the other end of the ceramic element 12. Furthermore, the internal electrodes 16a and 16b are formed so as to have intermediate parts and the other ends overlapped with the ceramic layers 14 interposed therebetween. Therefore, this ceramic element 12 has therein a laminated structure of the multiple internal electrodes 16a and 16b provided with the ceramic layers 14 interposed therebetween.

On one end surface of the ceramic element 12, a terminal electrode 18a is formed so as to be connected to the internal electrodes 16a. Likewise, on the other end surface of the ceramic element 12, a terminal electrode 18b is formed so as to be connected to the internal electrodes 16b. These terminal electrodes 18a, 18b are preferably formed to have minimum thicknesses required for soldering when the laminated ceramic capacitor is mounted on a circuit board or the like.

The terminal electrode 18a includes an external electrode 20a composed of, for example, Cu. The external electrode 20a is formed on one end surface of the ceramic element 12, so as to be connected to the internal electrodes 16a. Likewise, the terminal electrode 18b includes an external electrode 20b composed of, for example, Cu. The external electrode 20b is formed on the other end surface of the ceramic element 12, so as to be connected to the internal electrodes 16b.

In addition, on the surfaces of the external electrodes 20a and 20b, Ni plating films 22a and 22b are respectively formed for preventing solder erosion.

Furthermore, Sn plating films 24a and 24b are respectively formed as films to serve as the outermost layers in order to improve solderability, in a way that covers the Ni plating films 22a and 22b. These Sn plating films 24a and 24b each have a Sn polycrystalline structure, and each have Sn—Ni alloy flakes 25 formed at Sn crystal grain boundaries. Examples of the Sn—Ni alloy flakes include, for example, alloys containing therein 75 to 85 atm % of Sn. Furthermore, the Sn—Ni alloy flakes 25 may be formed within Sn crystal grains in the Sn plating films 24a and 24b. For the sake of simplification, the Sn—Ni alloy flakes 25 are omitted in FIG. 1. In addition, intermetallic compound layers 26a and 26b composed of $Ni_3Sn_4$ are formed at the interfaces between the Ni plating films 22a, 22b and the Sn plating films 24a, 24b. However, the intermetallic compound layers 26a and 26b do not always have to be formed.

The indictor for the extent, in terms of percentage, of the Sn—Ni alloy flakes 25 existing over the thickness of the Sn plating films 24a, 24b from surfaces of the Sn plating films 24a, 24b on the Ni plating films is defined as "Sn—Ni alloy flake reach (%)", and when Sn is removed from the Sn plating films to leave only the Sn—Ni alloy flakes 25, and observed, in a planar view, a surface with the Sn—Ni alloy flakes appearing through the Sn removal, the indicator for the percentage of the region occupied by the Sn—Ni alloy flakes 25 in the observed planar region is defined as "Sn—Ni alloy flake coverage (%)". In this case, the Sn plating films 24a, 24b of the electronic component according to the present invention are characterized in that the Sn—Ni alloy flake reach is 50% or less, and the Sn—Ni alloy flake coverage falls within the range of 15% to 60%.

The laminated ceramic capacitor 10 shown in FIG. 1 is configured as described above.

The present invention is based on the finding that the whisker-inhibiting ability is affected by the extent of the Sn—Ni alloy flakes 25 existing in the Sn plating films and the proportion of the Sn—Ni alloy flakes 25 existing in the case of a planar view of the terminal electrode. In this laminated ceramic capacitor 10, the ratio of an attained height of the Sn—Ni alloy flakes 25 from the surfaces of the Sn plating films 24a and 24b on the Ni plating films 22a and 22b to the thickness of the Sn plating films 24a and 24b, that is, the Sn—Ni alloy flake reach is limited to the range of 50% or less in the Sn plating films 24a and 24b. In addition, when Sn is removed from the Sn plating films 24a and 24b to leave only the Sn—Ni alloy flakes 25, and observed, in a planar view, a surface with the Sn—Ni alloy flakes 25 appearing through the Sn removal, the proportion of the region occupied by the Sn—Ni alloy flakes 25 to the observed planar region, that is, the Sn—Ni alloy flake coverage is limited to the range from 15% to 60%. As just described, the whisker-inhibiting ability is improved in terms of whisker generation length by limiting the Sn—Ni alloy flake reach and the Sn—Ni alloy flake coverage.

In addition, in the laminated ceramic capacitor 10 shown in FIG. 1, the Sn plating films 24a and 24b as the outermost layers each have a Sn polycrystalline structure, and have the Sn—Ni alloy flakes 25 formed at Sn crystal grain boundaries, thus preventing Sn atom transfer from one Sn crystal grain to Sn crystal grain boundaries, and even when any whisker is generated, suppressing growth thereof. In particular, when the Sn—Ni alloy flakes 25 are formed not only at the Sn crystal grain boundaries but also within the Sn crystal grains, compressive stress in the Sn plating films is relaxed to disperse the origins of whisker generation, and reduce the energy for whisker generation, thereby further increasing the whisker-inhibiting ability.

In addition, the laminated ceramic capacitor 10 shown in FIG. 1 has favorable solderability, because the Sn plating films 24a and 24b as the outermost layers are each formed from Sn.

Furthermore, in the laminated ceramic capacitor 10 shown in FIG. 1, the Sn—Ni alloy flakes 25 are present in the area from the surface of the Sn plating film on the Ni plating film side up to 50% of the thickness of the Sn plating films 24a and 24b, and oxidized Ni will not be thus produced on the surfaces of the Sn plating films as the outermost layers, which leads to favorably keep solderability.

Furthermore, the laminated ceramic capacitor 10 shown in FIG. 1 has the Ni plating films 22a and 22b each formed from Ni, and thus can prevent solder erosion.

Furthermore, the laminated ceramic capacitor 10 shown in FIG. 1 is also excellent in terms of environmental protection, because Pb is not used for the Ni plating films 22a, 22b and the Sn plating films 24a, 24b, etc.

Next, an example of a method for manufacturing a laminated ceramic capacitor will be described for manufacturing the laminated ceramic capacitor 10 shown in FIG. 1.

First, ceramic green sheets, a conductive paste for internal electrodes, and a conductive paste for external electrodes are prepared. The ceramic green sheets and various conductive pastes contain a binder and a solvent, and known organic binders and organic solvents can be used for the binder and solvent.

Next, on the ceramic green sheets, the conductive paste for internal electrodes is printed in a predetermined pattern by, for example, screen printing or the like to form internal electrode patterns.

Then, a mother laminated body is prepared by laminating a predetermined number of ceramic green sheets for outer layers without any internal electrode patterns printed, sequentially laminating thereon the ceramic green sheets with the internal electrode patterns printed, and laminating thereon a predetermined number of ceramic green sheets for outer layers.

Then, the mother laminated body is pressed in the laminating direction by means such as isostatic press.

Then, the pressed mother laminated body is cut into a predetermined size to cut out a raw ceramic laminated body. It is to be noted that the raw ceramic laminated body may have corners or ridges rounded by barrel polishing or the like in this case.

Then, the raw ceramic laminated body is subjected to firing. In this case, the firing temperature is preferably 900° C. to 1300° C., also depending on the materials of the ceramic layers 14 and internal electrodes 16a, 16b. The fired ceramic laminated body serves as the ceramic element 12 composed of the ceramic layers 14 and internal electrodes 16a, 16b for the laminated ceramic capacitor 10.

Then, the conductive paste for external electrodes is applied onto both end surfaces of the fired ceramic laminated body, and baked to form the external electrodes 20a and 20b of the terminal electrodes 18a and 18b.

The foregoing is an example of a common manufacturing process before plating the laminated ceramic capacitor in the method for manufacturing the laminated ceramic capacitor. An example of a step of plating external electrodes in the method for manufacturing the laminated ceramic capacitor will be described below with reference to FIG. 2. It is to be noted that in the following description, the Sn plating films 24a and 24b described above are composed of: first Sn plating films 28'a and 28'b including Sn—Ni alloy flakes as will be described later, which are formed on the Ni plating films; and second Sn plating films 30a and 30b formed on the first Sn plating films 28'a and 28'b including the Sn—Ni alloy flakes.

Figure 2A:
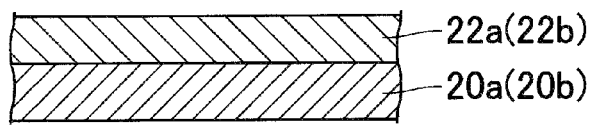
FIGS. 2(a) to 2(e) show examples of steps of providing a plating film in a method for manufacturing an electronic component according to the present invention.

First, as shown in FIG. 2(a), the Ni plating films 22a and 22b are formed by Ni plating respectively on the surface of the first external electrode 20a and the surface of the second external electrode 20b.

Figure 2B:
Figure 2B:
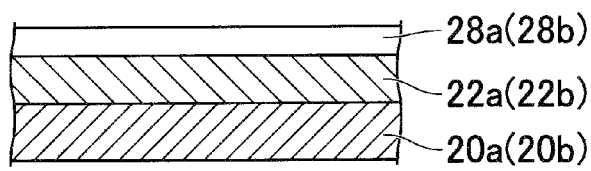

Then, as shown in FIG. 2(b), the first Sn plating films 28a and 28b are formed by metal plating with Sn respectively on the surfaces of the Ni plating films 22a and 22b.

Figure 2C:
Figure 2C:
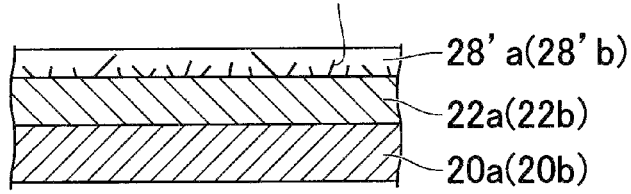

Furthermore, heat treatment carried out at a relatively low temperature for a long period of time forms the Sn—Ni alloy flakes 25 in the first Sn plating films 28a and 28b to the first Sn plating films 28'a and 28'b including the Sn—Ni alloy flakes, as shown in FIG. 2(c). The thickness of the first Sn plating films 28'a and 28'b including the Sn—Ni alloy flakes is adapted to 50% or less of the target total thickness of the Sn plating films 24a and 24b composed of: the first Sn plating films 28'a and 28'b including the Sn—Ni alloy flakes; and the second Sn plating films 30a and 30b as will be described below.

Figure 2D:
Figure 2D:
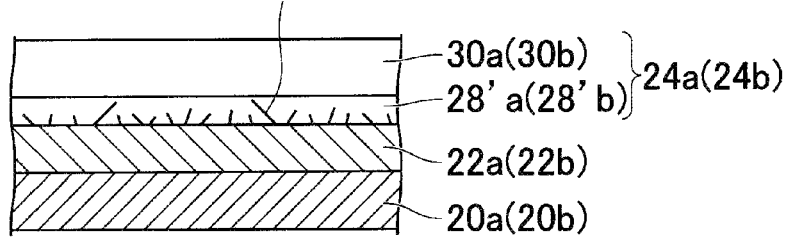

Furthermore, as shown in FIG. 2(d), the second Sn plating films 30a and 30b are formed by metal plating with Sn respectively on the surfaces of the first Sn plating films 28'a and 28'b including the Sn—Ni alloy flakes. These second Sn plating films 30a and 30b have no Sn—Ni alloy flakes 25 formed therein.

The first Sn plating films and second Sn plating films herein may be each formed by Sn plating more than once. In this case, the Sn—Ni alloy flakes 25 are formed after the first Sn plating films 28a and 28b are formed by Sn plating more than once.

Figure 2E:
Figure 2E:
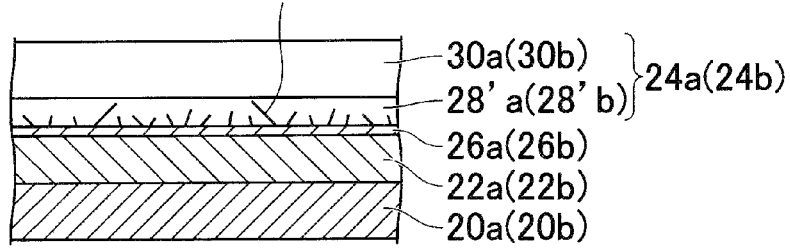
Figure 3:
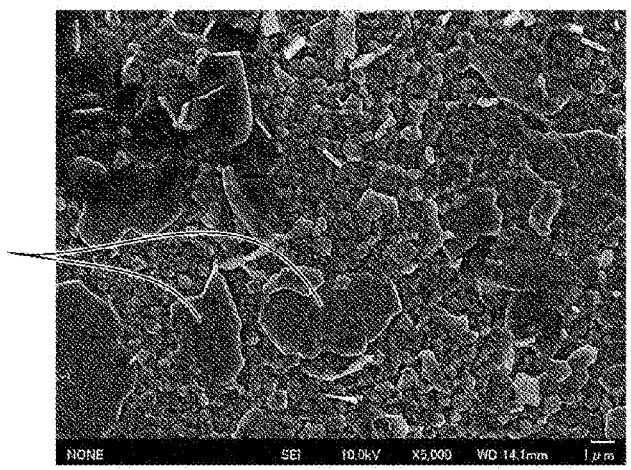
FIG. 3 is an electron micrograph of the surface of a plating film peeled by dissolving Sn in a Sn plating film of a laminated ceramic capacitor according to Example 1.
Figure 4:
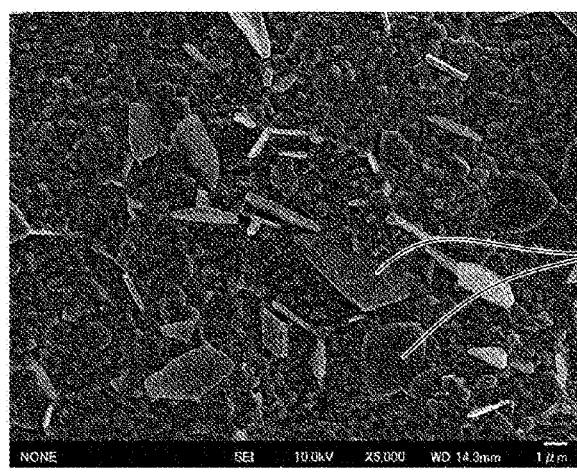
FIG. 4 is an electron micrograph of the surface of a plating film peeled by dissolving Sn in a Sn plating film of a laminated ceramic capacitor according to Comparative Example 1.
Figure 5:
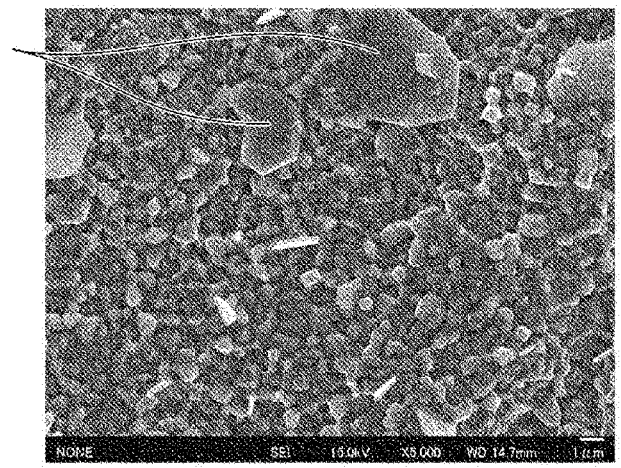
FIG. 5 is an electron micrograph of the surface of a plating film peeled by dissolving Sn in a Sn plating film of a laminated ceramic capacitor according to Comparative Example 2.
Figure 6:
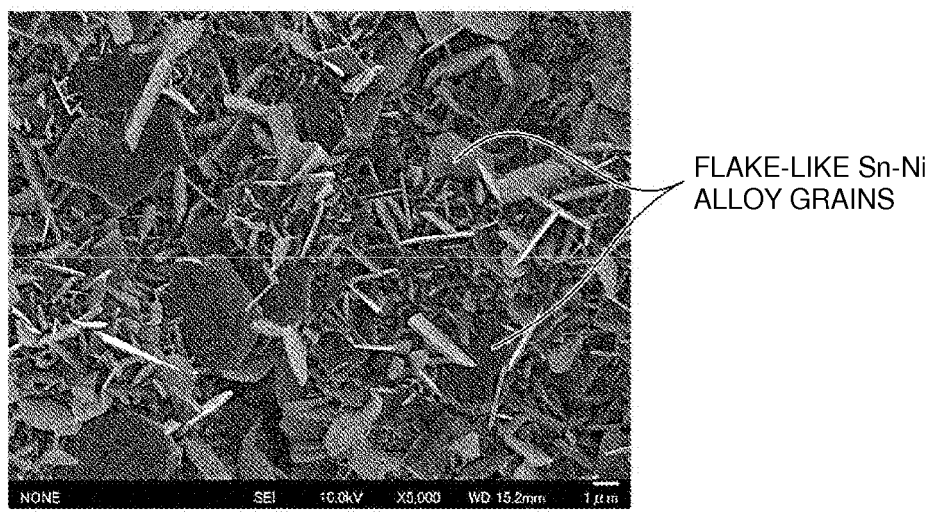
FIG. 6 is an electron micrograph of the surface of a plating film peeled by dissolving Sn in a Sn plating film of a laminated ceramic capacitor according to Comparative Example 3.

Optionally, as shown in FIG. 2(e), the ceramic element 12 with the Ni plating films 22a, 22b and Sn plating films 24a, 24b formed is subjected to heat treatment at a relatively high temperature for a short period of time to form the intermetallic compound layers 26a and 26b composed of $Ni_3Sn_4$ at the interfaces between the Ni plating films 22a, 22b and the Sn plating films 24a, 24b.

In the way described above, the laminated ceramic capacitor 10 is manufactured as shown in FIG. 1.

In the method described above with reference to FIG. 2, the Sn plating films 24a and 24b described above are formed in the separate steps of forming the first Sn plating films 28'a and 28'b including Sn—Ni alloy flakes, and forming the second Sn plating films 30a and 30b without the Sn—Ni alloy flakes 25. Thus, it is possible to adjust the area with the Sn—Ni alloy flakes 25 present in the thickness direction of the Sn plating films. In particular, the intended Sn plating films of the laminated ceramic capacitor 10 shown in FIG. 1 can be formed by adapting the thickness of the first Sn plating films 28'a and 28'b with the Sn—Ni alloy flakes to 50% or less of the total thickness of the Sn plating films 24a and 24b.

Experimental Example

In the experimental example, the following laminated ceramic capacitors according to Example 1, Comparative Example 1, Comparative Example 2, and Comparative Example 3 were produced to evaluate whiskers in plating films of the laminated ceramic capacitors.

Example 1

In Example 1, the laminated ceramic capacitor 10 shown in FIG. 1 was produced by the method described above. The step of plating external electrodes in the method for manufacturing the laminated ceramic capacitor was specifically adapted to have the following steps.

1. Preparation of object to be plated
2. Electrolytic Ni plating (formation of Ni plating films 22a, 22b)
3. Electrolytic Sn plating (formation of first Sn plating films 28a, 28b)
4. Drying
5. Formation of Sn—Ni alloy flakes 25 (formation of first Sn plating films 28'a, 28'b including Sn—Ni alloy flakes)
6. Electrolytic Sn plating (formation of second Sn plating films 30a, 30b)
7. Drying
8. Formation of intermetallic compound layers 26a, 26b of $Ni_3Sn_4$ (optional)

The respective steps will be described below.

(Step 1: Preparation of Object to be Plated)

The laminated ceramic capacitor as an object to be plated was adapted to have external dimensions of 2.0 mm in length, 1.25 mm in width, and 1.25 mm in height. In addition, a barium titanate dielectric ceramic was used as the ceramic layers 14 (dielectric ceramic). Furthermore, Ni was used as a material for the internal electrodes 16a, 16b. Furthermore, Cu was used as a material for the external electrodes 20a, 20b.

(Step 2: Electrolytic Ni Plating (Formation of Ni Plating Films 22a, 22b))

In Step 2, the Ni plating films 22a, 22b were formed by electrolytic Ni plating (see FIG. 2(a)). A rotary barrel was used as a plating system. For a Ni plating bath, 240 g/L of nickel sulfate, 45 g/L of nickel chloride, 30 g/L of boric acid, 8 g/L of sodium 1,5-naphthalenedisulfonate, and 0.008 g/L of gelatin were used at pH of 4.8 and a temperature of 55° C. The current density Dk was adjusted to 3.0 A/dm$^2$. Ni plating was carried out in a time-controlled manner such that the Ni plating films were 3.0 µm in thickness.

(Step 3: Electrolytic Sn Plating (Formation of First Sn Plating Films 28a, 28b)

In step 3, the first Sn plating films 28a, 28b were formed on the Ni plating films 22a, 22b by electrolytic Sn plating (see FIG. 2(b)). As in the case of step 2, a rotary barrel was used as a plating system. For the Sn plating bath, a weakly acidic Sn plating bath (citric acid-based weakly acidic bath) was used with tin sulfate as a metal salt, a citric acid as a complexing agent, and either one or both of a surfactant containing quaternary ammonium salt and a surfactant containing alkyl betaine as a brightening agent added thereto. The current density Dk was adjusted to 0.5 A/dm$^2$. Sn plating was carried out in a time-controlled manner such that the thickness of the first Sn plating films 28a, 28b was 1.5 µm, which corresponds to 50% or less of the target total thickness of 4.0 µm for the Sn plating films 24a, 24b.

(Step 4: Drying)

In step 4, drying was carried out in air at 80° C. for 15 minutes.

(Step 5: Formation of Sn—Ni Alloy Flakes 25 (Formation of First Sn Plating Films 28'a, 28'b Including Sn—Ni Alloy Flakes))

Next, heat treatment was carried out at 90° C. for 12 hours, in order to form the Sn—Ni alloy flakes 25 in the first Sn plating films 28a, 28b. The heat treatment was carried out in the atmosphere, but may be carried out in a nitrogen atmosphere or in a vacuum atmosphere. This treatment turned the first Sn plating films 28a, 28b into the first Sn plating films 28'a, 28'b including the Sn—Ni alloy flakes (see FIG. 2(c)).

(Step 6: Electrolytic Sn Plating (Formation of Second Sn Plating Films 30a, 30b)

In step 6, the second Sn plating films 30a, 30b were formed by electrolytic Sn plating on the first Sn plating films 28'a, 28'b including the Sn—Ni alloy flakes (see FIG. 2(d)). As in the case of step 2 and step 3, a rotary barrel was used as a plating system. For the Sn plating bath, a Sn plating bath (citric acid-based weakly acidic bath) was used as in the case of step 3. The current density Dk was also adjusted to 0.5 A/dm$^2$ as in the case of step 3. Sn plating was carried out in a time-controlled manner such that the thickness of the second Sn plating films 30a, 30b was 2.5 µm, which corresponds to 50% or more of the target total thickness of 4.0 µm for the Sn plating films 24a, 24b.

(Step 7: Drying)

In step 7, drying was carried out in air at 80° C. for 15 minutes as in the case of step 4.

(Step 8: Formation of intermetallic compound layers 26a, 26b of Ni$_3$Sn$_4$)

Finally, heat treatment was carried out at 150° C. for 10 minutes to form the intermetallic compound layers 26a and 26b of Ni$_3$Sn$_4$ at the interfaces between the Ni plating films 22a, 22b and the first Sn plating films 28'a, 28'b including the Sn—Ni alloy flakes (see FIG. 2(e)). It is to be noted that cleaning with pure water was carried out after each plating.

Comparative Example 1

Comparative Example 1 differs substantially from Example 1 in that the step 6 and step 7 described above are not included. More specifically, Comparative Example 1 was adapted such that only the first Sn plating films 28'a, 28'b including the Sn—Ni alloy flakes were present without the step of forming the second Sn plating films 30a, 30b. In addition, Comparative Example 1 also differs from Example 1 in that Sn plating was carried out in a time-controlled manner such that the first Sn plating films 28a, 28b were 4.0 µm in thickness, rather than 1.5 µm in step 3. It is to be noted that the target thickness of the Sn plating films according to Comparative Example 1 is 4.0 µm which is equal to the target total thickness of the Sn plating films 24a and 24b according to Example 1. Except for these respects, the same steps as in Example 1 were adopted.

Comparative Example 2

Comparative Example 2 differs from Comparative Example 1 in the time for the heat treatment for forming the Sn—Ni alloy flakes 25 in step 5, while plating films were formed in accordance with the same step as in Comparative Example 1. The heat treatment time in step 5 in Comparative Example 1 was 12 hours as in the case of Example 1, whereas the time was adjusted to 6 hours in Comparative Example 2. The other steps were carried out in the same manner as in Comparative Example 1.

Comparative Example 3

Comparative Example 3 also, as in the case of Comparative Example 2, differs from Example 1 and Comparative Example 1 in the time for the heat treatment for forming the Sn—Ni alloy flakes 25 in step 5. The heat treatment time in step 5 in Comparative Example 3 was adjusted to 90 hours. The other steps were carried out in the same manner as in Comparative Example 1.

Next, for the respective laminated ceramic capacitors according to Example 1, Comparative Example 1, Comparative Example 2, and Comparative Example 3, whiskers in the films were evaluated in terms of whisker length in conformity with JEDEC standards below.

Sample Number (n): 3 lots×6 pieces/lot=18 pieces

Test Condition: −55° C. (+0/−10) as a minimum temperature; 85° C. (+10/−0) as a maximum temperature; applying 1500 cycles of thermal shock in a gas-phase system while keeping for 10 minutes at each temperature Observation Method: observation in electron micrographs at 1000-fold magnification with the use of a scanning electron microscope (SEM)

FIGS. 3 through 6 respectively show electron micrographs of the surfaces of the plating films peeled by dissolving Sn in the Sn plating films of the laminated ceramic capacitors according to Example 1, Comparative Example 1, Comparative Example 2, and Comparative Example 3. In addition, Table 1 shows the Sn—Ni alloy flake coverage, Sn—Ni alloy flake reach, and maximum length of whisker obtained for Example 1, Comparative Example 1, Comparative Example 2, and Comparative Example 3. In this case, the Sn—Ni alloy flake coverage in, for example, FIG. 3 refers to the ratio of the region occupied by the Sn—Ni alloy flakes 25 to the planar region observed in the micrograph of FIG. 3.

TABLE 1

| Sample | Sn—Ni Alloy Flake Coverage | Sn—Ni Alloy Flake Reach | Maximum Length of Whisker (μm) |
|---|---|---|---|
| Example 1 | 21% | 38% | 5 |
| Comparative Example 1 | 10% | 75% | 25 |
| Comparative Example 2 | 8% | 36% | 23 |
| Comparative Example 3 | 75% | 38% | 20 |

As a result, the Sn—Ni alloy flake coverage falls within the range of 15% to 60% only in Example 1, and the Sn—Ni alloy flake reach is 50% or less in Example 1, Comparative Example 2, and Comparative Example 3. In comparison among the maximum lengths of whiskers, Comparative Example 1, Comparative Example 2, and Comparative Example 3 are 20 μm or more, whereas Example 1 is most favorably 5 μm.

As just described, from the results of Example 1 and Comparative Example 1, it is determined that the extent of the Sn—Ni alloy flakes 25 existing in the Sn plating films 24a, 24b differs in spite of the same heat treatment time for forming the Sn—Ni alloy flakes 25, and it is determined that the manufacturing method according to the present invention allows the Sn—Ni alloy grain coverage to fall within the range of 15% to 60% while keeping the Sn—Ni alloy grain reach at 50% or less. In addition, in comparison among the maximum lengths for each whisker, it is confirmed that the whisker-inhibiting ability is improved in terms of whisker length in Example 1 with the Sn—Ni alloy grain reach of 50% or less and the Sn—Ni alloy grain coverage falling within the range of 15% to 60%.

Further, it has been confirmed that the respective thicknesses of the Ni plating films 22a, 22b have no influence on the whiskers as long as the base external electrodes 20a, 20b can be covered with the films, and it is possible to apply any thickness of 1 μm or more.

While the barium titanate dielectric ceramic is used as a dielectric in the embodiment described above, calcium titanate, strontium titanate, and calcium zirconate dielectric ceramics, for example, may be used instead. In addition, the dielectric ceramics with accessory constituents added thereto, such as, for example, Mn compounds, Mg compounds, Si compounds, Co compounds, Ni compounds, and rare-earth compounds, may be used as ceramic materials for the ceramic layers 14.

While Ni is used as the internal electrodes in the embodiment described above, Cu, Ag, Pd, Ag—Pd alloys, and Au, for example, may be used instead.

While Cu is used as the external electrodes in the embodiment described above, one metal selected from the group consisting of Ag and Ag/Pd, or an alloy containing the metal, for example, may be used instead.

The electronic component according to the present invention is preferably used for electronic components such as, in particular, laminated ceramic capacitors densely mounted, for example.

DESCRIPTION OF REFERENCE SYMBOLS

10 laminated ceramic capacitor
12 ceramic element
14 ceramic layer
16a, 16b internal electrode
18a, 18b terminal electrode
20a, 20b external electrode
22a, 22b Ni plating film
24a, 24b Sn plating film
25 flake-like Sn—Ni alloy grain
26a, 26b intermetallic compound layer
28a, 28b first Sn plating film
28'a, 28'b first Sn plating film including Sn—Ni alloy flakes
30a, 30b second plating film

The invention claimed is:

1. An electronic component comprising:
   an electronic component element having an external electrode;
   a Ni plating film on the external electrode; and
   a Sn plating film covering the Ni plating film,
   wherein the Sn plating film has Sn—Ni alloy flakes therein,
   the Sn—Ni alloy flakes are present in a range from a surface of the Sn plating film on the Ni plating film to 50% or less of the thickness of the Sn plating film, and
   when Sn is removed from the Sn plating film to leave only the Sn—Ni alloy flakes, an observed planar view of a region occupied by the Sn—Ni alloy flakes falls within a range from 15% to 60% of the observed planar region.

2. The electronic component according to claim 1, further comprising an intermetallic compound layer comprising $Ni_3Sn_4$, the intermetallic compound layer located between the Ni plating film and the Sn plating film.

3. The electronic component according to claim 1, wherein the electronic component element is a laminated ceramic capacitor.

4. The electronic component according to claim 1, wherein the Sn plating film has a Sn polycrystalline structure.

5. The electronic component according to claim 4, wherein, the Sn—Ni alloy flakes are at Sn crystal grain boundaries of the Sn plating film.

6. The electronic component according to claim 5, wherein the Sn—Ni alloy flakes are within the Sn crystal grains in the Sn plating film.

7. The electronic component according to claim 1, wherein the Sn—Ni alloy flakes contain therein 75 to 85 atm % of Sn.

8. A method for manufacturing an electronic component, the method comprising:
   providing an electronic component element having an external electrode;
   forming a Ni plating film on the external electrode;
   forming a first Sn plating film on the Ni plating film;
   forming Sn—Ni alloy flakes in the first Sn plating film; and
   forming a second Sn plating film on the first Sn plating film so that a thickness of the first Sn plating film falls within a range of 50% or less of a thickness of the entire Sn plating film comprising the first Sn plating film and the second Sn plating film.

9. The method for manufacturing an electronic component according to claim 8, further comprising forming an intermetallic compound layer of $Ni_3Sn_4$ between the Ni plating film and the first Sn plating film after the forming of the second Sn plating film.

10. The method for manufacturing an electronic component according to claim 8, wherein the electronic component element is a laminated ceramic capacitor.

11. The method for manufacturing an electronic component according to claim 8, wherein the first Sn plating film has a Sn polycrystalline structure.

12. The method for manufacturing an electronic component according to claim 11, wherein, the Sn—Ni alloy flakes are at Sn crystal grain boundaries of the first Sn plating film.

13. The method for manufacturing an electronic component according to claim 12, wherein the Sn—Ni alloy flakes are within the Sn crystal grains in the first Sn plating film.

14. The method for manufacturing an electronic component according to claim 1, wherein the Sn—Ni alloy flakes contain therein 75 to 85 atm % of Sn.

\* \* \* \* \*